United States Patent
Zheng et al.

(10) Patent No.: US 8,046,559 B2
(45) Date of Patent: Oct. 25, 2011

(54) MEMORY RANK BURST SCHEDULING

(75) Inventors: Hongzhong Zheng, Chicago, IL (US);
Ulf R. Hanebutte, Gig Harbor, WA (US); Eugene Gorbatov, Hillsboro, OR (US); Howard David, Portland, OR (US)

(73) Assignee: Intel Corporation, Santa Clara, CA (US)

(*) Notice: Subject to any disclaimer, the term of this patent is extended or adjusted under 35 U.S.C. 154(b) by 519 days.

(21) Appl. No.: 12/057,132

(22) Filed: Mar. 27, 2008

(65) Prior Publication Data
US 2009/0248994 A1 Oct. 1, 2009

(51) Int. Cl.
*G06F 12/00* (2006.01)

(52) U.S. Cl. .............. 711/167; 711/152; 711/E12.001

(58) Field of Classification Search .............. 711/167, 711/152, 151, 105; 713/1, 2
See application file for complete search history.

(56) References Cited

U.S. PATENT DOCUMENTS

| | | | |
|---|---|---|---|
| 4,570,195 A | 2/1986 | Shimaoka et al. | |
| 6,112,265 A | 8/2000 | Harriman | |
| 6,880,028 B2 | 4/2005 | Kurth | |
| 7,299,324 B2 | 11/2007 | Shrader | |
| 7,669,044 B2* | 2/2010 | Fitzgerald et al. | 713/1 |
| 7,870,351 B2* | 1/2011 | Resnick | 711/155 |
| 2003/0177296 A1 | 9/2003 | Kurth | |
| 2005/0135355 A1* | 6/2005 | Muthukrishnan et al. | 370/389 |

OTHER PUBLICATIONS

International Search Report and Written Opinion mailed Nov. 3, 2009 for International Patent Application No. PCT/US2009/038522; 10 pages.

* cited by examiner

*Primary Examiner* — Pierre-Michel Bataille
(74) *Attorney, Agent, or Firm* — Derek J. Reynolds

(57) ABSTRACT

A method, device, and system are disclosed. In one embodiment the method includes grouping multiple memory requests into multiple of memory rank queues. Each rank queue contains the memory requests that target addresses within the corresponding memory rank. The method also schedules a minimum burst number of memory requests within one of the memory rank queues to be serviced when the burst number has been reached in the one of the plurality of memory rank queues. Finally, if a memory request exceeds an aging threshold, then that memory request will be serviced.

22 Claims, 6 Drawing Sheets

MEMORY RANK BURST SCHEDULING

FIELD OF THE INVENTION

The invention relates to scheduling traffic to a memory subsystem. More specifically, the invention relates to scheduling bursts of memory requests by grouping requests to the same memory ranks.

BACKGROUND OF THE INVENTION

Different memory scheduling policies have been proposed and implemented in recent years in the computer industry to improve performance of the memory subsystem. However, lately energy efficiency has become a first order consideration in designing memory subsystems. Thus, sometimes it is beneficial for certain computer systems to sacrifice some latency at times in the memory subsystem to improve upon overall power consumption of the memory subsystem as a whole.

Modern memory modules are normally divided into several memory ranks, where each rank has several banks. Power delivery to memory subsystems can often be broken up to have power delivered independently for each memory rank. Computer systems with advanced power management features have the capability to have subsystems such as the memory subsystem brought into low power idle states as well as being in full power operational states.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
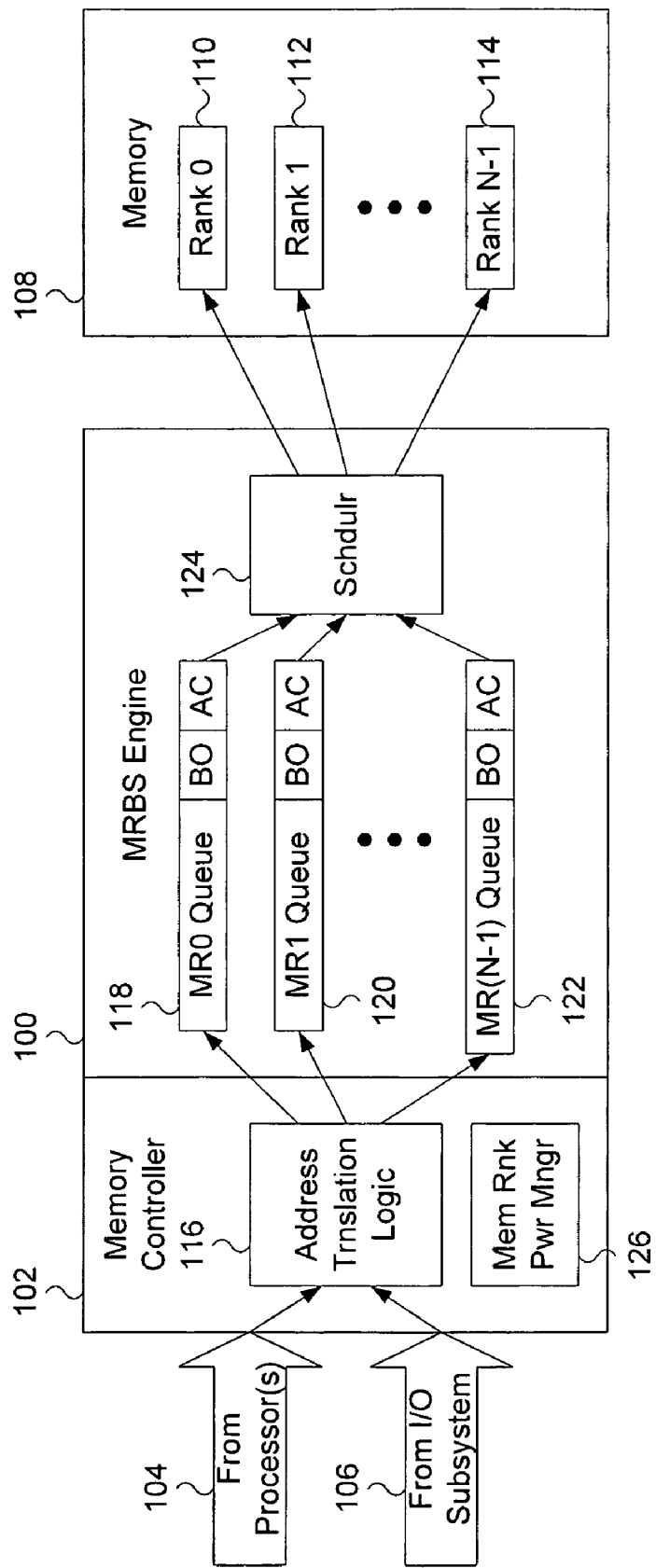
FIG. 1 illustrates an embodiment of a MRBS engine. In many embodiments, the MRBS engine 100 is communicatively coupled to a memory controller 102.

Embodiments of a method, device, and system to schedule memory requests using a memory rank burst scheme are disclosed. In many of the embodiments described below, a memory rank burst scheduling (MRBS) engine resides in a computer system that includes a memory with multiple ranks. The MRBS engine receives memory requests from one or more processors and/or one or more input/output (I/O) devices. Address translation logic determines what memory rank in the memory within the computer system that each of the received memory requests is targeting. The requests are then sorted into a number of memory rank queues where there is a memory rank queue per memory rank.

The MRBS engine then schedules groups of requests to be sent to memory in bursts, where each burst comprises multiple requests. The MRBS also monitors all of the ranks to make sure that none of the ranks has a memory request that is being starved from completion because the memory rank queue it resides within doesn't receive enough requests to constitute a valid burst. If any of the memory requests in any of the rank queues exceeds an aging threshold (i.e. the request is being starved), then that request gets sent to memory even if the request must get sent by itself and doesn't comply with the minimum burst number of requests rules that the MRBS engine utilizes.

When access to memory ranks is broken up into bursts per rank, the ranks can individually be in idle states for a significant portion of the time the computer system is operational. Thus, by providing a rank bursting scheme, the times where ranks are idle in between bursts may allow an advanced power delivery and management system to bring one or more ranks into low power idle states between bursts, which will lower the overall power consumption of the memory subsystem.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Furthermore, in the following description and claims, the term "communicatively coupled" along with its derivatives may be used in particular embodiments to describe a coupling (i.e. "coupled" as explained above) that allows two or more elements to communicate with each other by some means through the coupling medium itself (the coupling medium being an interconnect, a network, a copper wire, etc.).

FIG. 1 illustrates an embodiment of a MRBS engine. In many embodiments, the MRBS engine 100 is communicatively coupled to a memory controller 102. In other embodiments, the MRBS engine 100 is integrated into the memory controller 102. The memory controller 102 receives memory requests from one or more processors (input from processors 104) that are communicatively coupled to the memory controller 102. In many embodiments, the memory controller 102 is integrated into at least one of the one or more processors. The one or more processors can each have one or more processor cores in different embodiments. Additionally, in many embodiments, the memory controller 102 also receives memory requests from one or more I/O devices (input from I/O 106) from an I/O subsystem communicatively coupled to the memory controller 102. The I/O subsystem may include one or more I/O host controllers coupled to one or more I/O devices. The I/O host controllers may include one or more universal serial bus (USB) host controllers and one or more peripheral component interconnect (PCI) Express® host controllers, among others.

Furthermore, the MRBS engine 100 is communicatively coupled to a memory 108. The memory 108 may be one or more types of memory in different embodiments such as a dynamic random access memory (DRAM). The memory may include one or more memory modules such as a dual inline memory module (DIMM) or any derivatives thereof. The memory module may include multiple memory ranks as well as multiple memory banks per memory rank. In some embodiments, the memory includes N ranks, which starts with memory rank 0 (110) and memory rank 1 (112) and continues through memory rank N-1. For example, there may be eight memory ranks. There may be eight memory banks per memory rank in certain examples.

The processors, I/O subsystem, memory controller, MRBS engine, and multiple-ranked memory reside within a computer system. In different embodiments, the computer system may be a desktop computer, laptop computer, server computer, handheld device, television set-top computer, or any one of many other types of computer systems.

In many embodiments, the memory controller has an input queue (not shown) to receive all memory requests from the one or more processors 104 and the I/O subsystem 106. The memory controller 102 includes address translation logic 116 to sort each memory request into the physical rank the address in the memory request is targeting. Thus, the address translation logic 116 sends each memory request into one of the rank queues: memory rank 0 queue 118, memory rank 1 queue 120, through memory rank N-1 queue 122.

In many embodiments, a scheduler 124 oversees the state of each memory rank queue and will schedule a burst of memory requests to be sent to the memory 108 after one or more predetermined requirements are met. In many embodiments, one requirement includes a minimum burst number of memory requests from a rank queue. Thus, if the minimum burst number is two, the scheduler 124 will wait until two memory requests are present in a given rank queue before the requests are sent to the memory 108. So a first request might arrive at a time A and a second request may arrive at a time B, and the first and second requests are then scheduled in a burst of two requests at time B, which requires the first request to wait for the difference in absolute time from time A to time B before it is serviced (i.e. scheduled and sent to the memory 108).

Additionally, in many embodiments another requirement the scheduler 124 adheres to includes a maximum burst number of memory requests from a rank queue. Thus, if the maximum burst number is eight, the scheduler 124 will schedule no more than eight bursts at a time from a given rank before moving to another rank. Though, if no other rank queue has a minimum burst number of pending requests, the scheduler 124 may immediately return to the same rank queue and schedule another burst if the rank queue has an additional minimum burst number of requests beyond the first maximum burst number of requests.

Each rank queue includes a bank overlap bit array (BO) as well as an aging counter (AC). The BO includes a stored bit of information for each of the banks that make up the corresponding memory rank. For example, if there are eight banks that comprise memory rank 0, there will be an 8-bit value in the bank overlap bit array, where each bit in the value corresponds to a specific bank.

This value per bit signifies whether a bank is represented in the rank queue. In many embodiments, it is more beneficial to have a memory rank burst using memory requests in the rank burst to different banks. Bank overlap refers to multiple banks being accessed in a given burst of memory requests to a single memory rank. Thus, if the minimum burst number is two, in some embodiments, to be viewed as having two memory requests available for a single burst, the memory requests in the queue must be targeting different banks in the memory rank.

Alternatively, if the minimum burst number is two and there are two pending memory requests in a single rank queue, but the two memory requests are to the same bank, then this pair of memory requests would not qualify to be in the same burst, and a burst could not yet take place.

In many embodiments, the bank overlap bit array just tracks whether there is at least one pending memory request in a given rank queue that is targeting a specific bank. Thus, there may be more than one pending memory request targeting a specific bank, but the bit will be "1" if at least one request is present (which may mean that 2, 5, 10, etc. requests are present). As soon as no requests are present for the specific bank, the bit switches to "0". In many embodiments, the maximum burst number is equal to the number of banks in a rank.

The aging counter tracks how stale the oldest memory request is in a corresponding rank queue. The stale-ness of a given memory request refers to how long the memory request has been sitting in the memory rank queue. If a memory request sits for too long without being scheduled (i.e. serviced), starvation can occur, which can cause a processor or I/O device to stall (if the processor/device has other operations that are dependent on the memory request being serviced). Thus, the aging counter can count the number of clocks that have passed since the oldest request in the memory rank queue arrived. If the memory request has been sitting in the memory request queue for a period of time that passes an aging threshold, then the memory request will be scheduled even if the memory rank queue does not have the requisite number of requests to qualify for a rank burst. In many embodiments, the aging threshold value can be modified up or down through a configuration register accessible in the basic input/output system (BIOS) or elsewhere.

Therefore, the scheduler 124 utilizes criteria such as the aging counter, the bank overlap bit array, and the minimum and maximum burst numbers to order the bursts of memory requests. In many embodiments, the memory rank that the scheduler 124 is currently operating on may be referred to as the working rank. The working rank can change between memory rank 0 queue 118, memory rank 1 queue 120, up through memory rank N-1 queue 122.

In many embodiments, a memory rank power manager 126 is present in the computer system. The memory rank power manager 126 includes logic to power up and power down each rank in the memory 108 individually. Thus, the memory rank power manager 126 can bring an individual rank from an idle (low power state) up to an active state (full power state) and back again. Additionally, the memory rank power manager 126 may also be able to put individual memory ranks in additional power states of intermediate memory readiness levels. The memory rank power manager 126 may have logic to make its own decision or it may receive rank power related commands from the memory controller 102, the MRBS engine 100, or from elsewhere in the system. Although FIG. 1 shows the memory rank power manager integrated into the memory controller 102, in other embodiments (not shown), the memory rank power manager may be located in the MRBS engine, on a memory module, or in another power management device elsewhere in the system.

Figure 2:
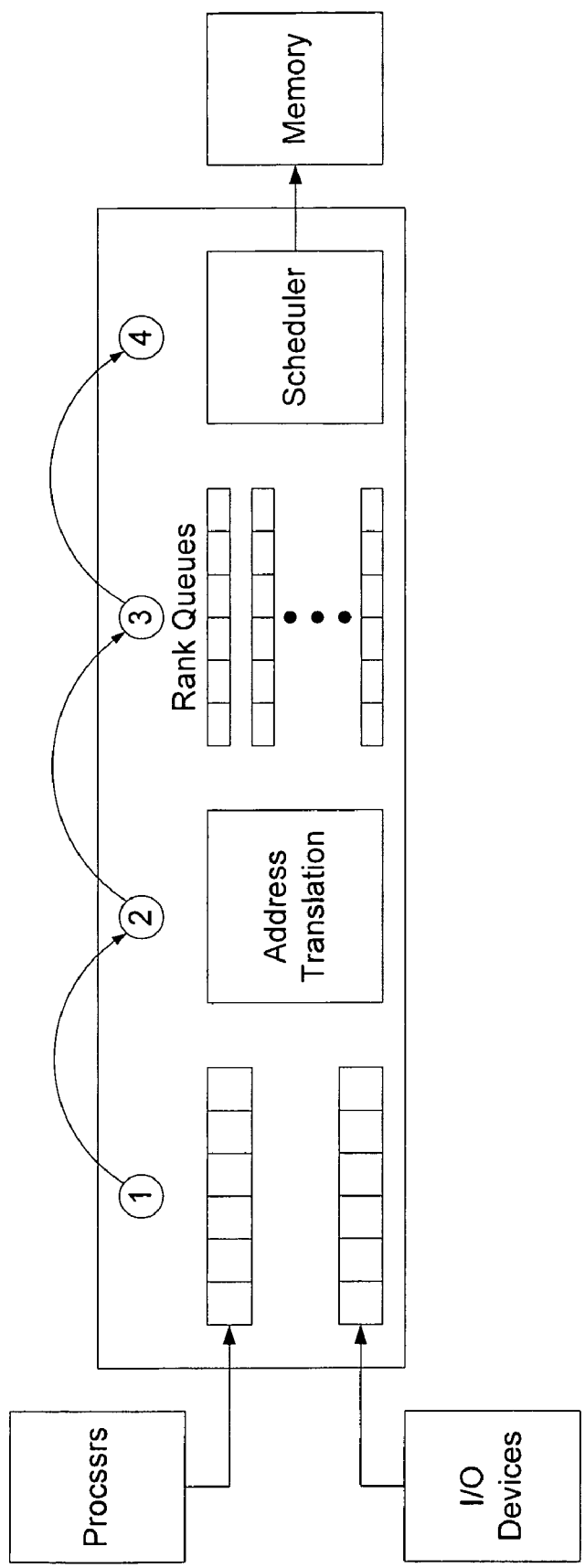
FIG. 2 illustrates an example process flow of memory requests from their origination to destination.

FIG. 2 illustrates an example process flow of memory requests from their origination to destination. The process starts by one or more processors and/or one or more I/O devices sending one or more memory requests to the memory controller for servicing. These requests enter one or more input queues in the memory controller (step 1). The memory controller then translates the target address in each memory request to determine to which corresponding rank queue the request is sent (step 2). Then the scheduler orders the bursts of memory requests utilizing ordering criteria such as the aging counter, the bank overlap bit array, and the minimum and maximum burst numbers (step 3). Finally, the scheduler sends the next memory request to the memory from the working rank per memory cycle, if a memory request is ready to be sent (step 4).

FIGS. 3-8 describe many memory request burst ordering schemes based on different criteria.

Figure 3:
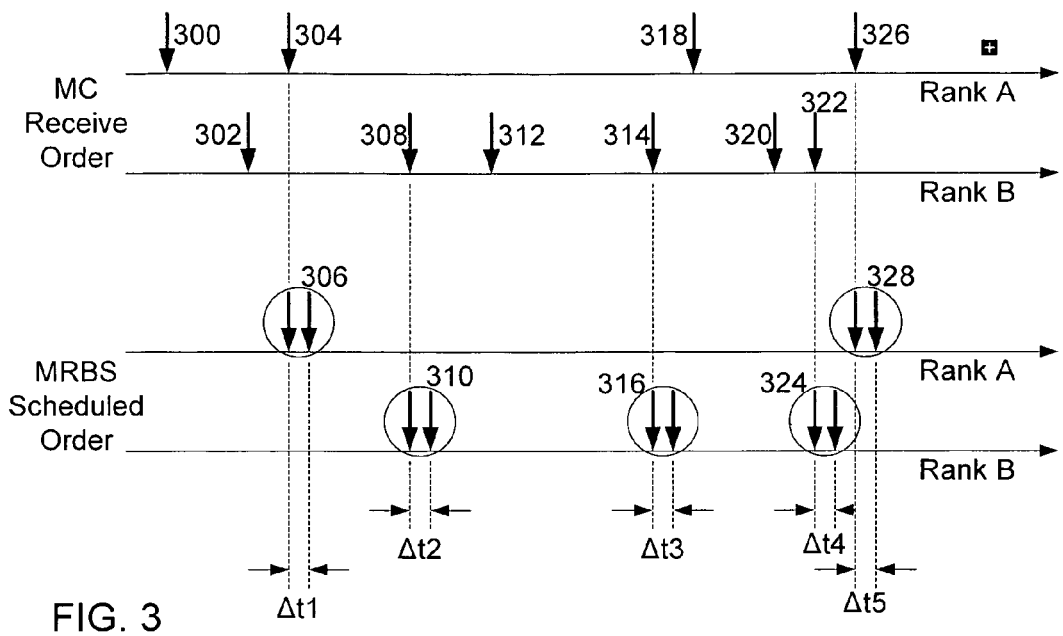
FIGS. 3-8 describe many memory request burst ordering schemes based on different criteria.

FIG. 3 describes a first embodiment of a memory request burst ordering scheme on two memory ranks. The diagram shows the order of a number of memory requests (vertical arrows) arriving from one or more processors and/or one or more I/O devices to a memory controller (MC)—i.e. the "memory controller receive order" of requests. The diagram also shows the "MRBS scheduled order" of the requests applying one or more of the criteria discussed above. The timing diagram shows first to last arrival order of memory requests going across the time line from left to right. Additionally, the timing diagram does not take into account additional overhead associated with receiving requests into the input queues, address translation time, memory access latencies, or entering/exiting low power/high power states per memory rank, among other potential timing issues. These timing issues may be assumed as normal for any given function and built into the timing diagrams as background constants that could be added to the timings to get absolute delays between events.

Turning now to FIG. 3, the major criteria shown here for burst scheduling is the minimum burst number being set to two. Memory request 300 targeting rank A arrives first. Then memory request 302 targeting rank B arrives second. As soon as memory request 304 targeting rank A arrives third, the scheduler schedules the first burst 306 because the rank A queue now meets the minimum burst number for a burst to take place (burst of length 2). Burst 306 takes time delta 1 ($\Delta t1$) to complete. Thus, at the beginning of $\Delta t1$, rank A must exit its idle state so memory requests 300 and 304 can be completed, and then rank A may return to its idle state.

Next, memory request 308 arrives targeting rank B, which makes rank B now meet the minimum burst length criteria. Thus, burst 310 takes place over $\Delta t2$. Rank B must exit its idle state at the beginning of $\Delta t2$ so memory requests 302 and 308 can be completed. At this point rank B may return to its idle state.

Then memory request 312 arrives targeting rank B. Rank B does not yet meet the minimum burst number criteria because after burst 310 took place, memory requests 302 and 308 were flushed out of the rank B queue. Thus, memory request 312 at this point is the only request stored in the rank B queue. Next, memory request 314 arrives targeting rank B, which makes rank B now meet the minimum burst length criteria again. Thus, burst 316 takes place over $\Delta t3$. Rank B must exit its idle state at the beginning of $\Delta t3$ so memory requests 312 and 314 can be completed. At this point rank B may return to its idle state.

Memory request 318 targeting rank A arrives next. Then memory request 320 targeting rank B arrives. As soon as memory request 322 targeting rank B arrives, the scheduler schedules burst 324 because the rank B queue again meets the minimum burst number. Burst 324 takes $\Delta t4$ to complete. Thus, at the beginning of $\Delta t4$, rank B must exit its idle state so memory requests 320 and 322 can be completed, and then rank B may return to its idle state.

Finally, memory request 326 arrives targeting rank A, which makes rank A now meet the minimum burst length criteria. Thus, burst 328 takes place over $\Delta t5$. Rank A must exit its idle state at the beginning of $\Delta t5$ so memory requests 318 and 326 can be completed. At this point rank B may return to its idle state.

Figure 4:
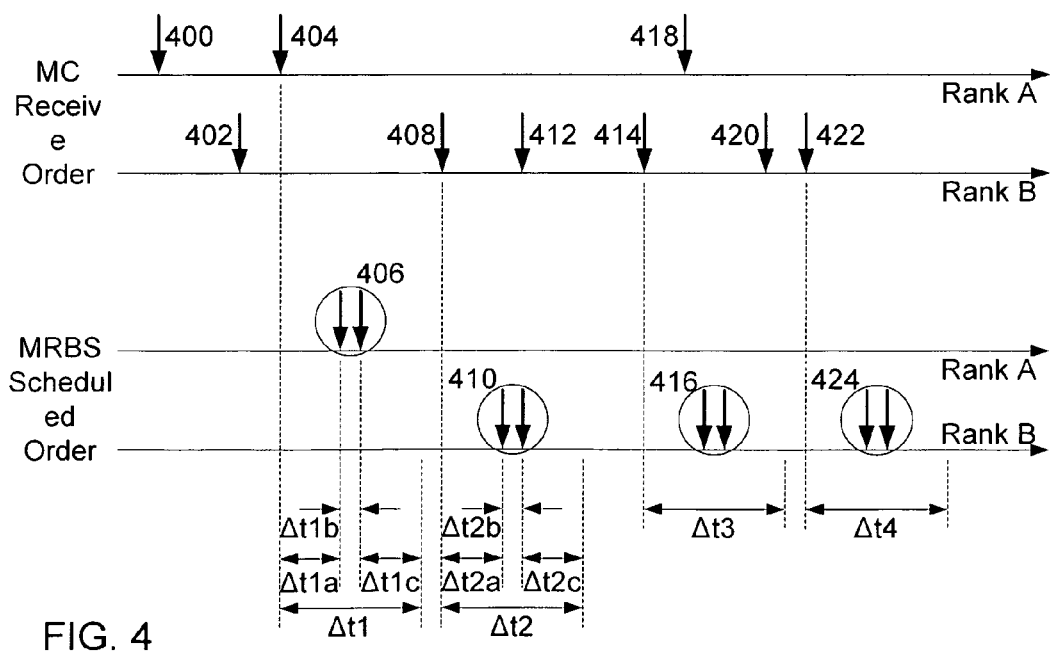

FIG. 4 describes a second embodiment of a memory request burst ordering scheme on two memory ranks. The major criteria shown here for burst scheduling are the minimum burst number being set to two as well as an additional rank pre-active time and post-active time being implemented around each burst. In many embodiments, a pre-active and/or a post-active time may be a requirement for the power scheme of the memory rank. The relative size of the pre- and post-active times versus the burst time itself in FIG. 4 may not be to scale or indicative of the true ratio of pre-active and post-active periods of time to the burst time.

Turning now to FIG. 4, memory request 400 targeting rank A arrives first. Then memory request 402 targeting rank B arrives second. As soon as memory request 404 targeting rank A arrives third, the scheduler schedules the first burst 406 because the rank A queue now meets the minimum burst number for a burst to take place (burst of length 2). Burst 406 takes $\Delta t1$ to complete. Thus, at the beginning of $\Delta t1$, rank A must exit its idle state so memory requests 400 and 404 can be completed, and then rank A may return to its idle state at the end of $\Delta t1$.

In the embodiment in FIG. 4, a rank has a pre-active time where the rank needs to power up to a full active state. This may take a small but finite amount of time. In some embodiments this may take one or more memory cycles to complete the power up to an active state (i.e. pre-active time) and one or more memory cycles to complete the power down to an idle state (i.e. post-active time). Specifically, the pre-active time portion of $\Delta t1$ is $\Delta t1a$, the actual burst time is $\Delta t1b$ and the post-active time to return rank B to idle is $\Delta t1c$. Thus, it's possible that a delay of $\Delta t1a$ may occur between when the scheduler schedules burst 406 and when burst 406 actually takes place. Additionally, a delay of $\Delta t1c$ may occur between when the scheduler completes burst 406 and when rank A is actually back in an idle state. The actual length in absolute time of $\Delta t1a$, $\Delta t1b$, and $\Delta t1c$ are dependent on memory implementation.

In some embodiments, the pre-active time may be reduced if logic within the memory controller and/or logic within the MRBS can preemptively begin ramping up power for a memory rank from idle to active. In some embodiments, preemptive logic that may snoop or otherwise see requests either as they arrive at the memory controller or see requests as they leave their origination devices (e.g. processors, I/O devices) can communicate to the scheduler an order of future received memory requests per rank before the memory requests actually arrive at the scheduler.

This preemptive logic (not explicitly shown in FIG. 1) may reside within the memory controller, within the scheduler, or elsewhere within the system. Thus, with the future memory request information (e.g. a future memory request arrival order) received from the preemptive logic, memory rank power management logic (e.g. memory rank power manager 126 in FIG. 1) may have the ability to manipulate memory rank power states in advance of the time when a certain memory rank power state is required. This may allow a pre-active time to be reduced because a rank can be powered up to be active exactly when a memory request burst scheduling event is scheduled by the scheduler.

Next, memory request 408 arrives targeting rank B, which makes rank B now meet the minimum burst length criteria. Thus, burst 410 takes place over $\Delta t2$. Rank B must exit its idle state at the beginning of $\Delta t2$ so memory requests 402 and 408 can be completed. At this point rank B may return to its idle state. Memory rank B takes pre-active time $\Delta t2a$ to power up from an idle state to an active state. Thus, from the moment in time that the scheduler schedules burst 410, a delay of $\Delta t2a$ takes place, then the actual burst takes place over Δt2b, and finally memory rank B takes Δt2c of post-active time to return rank B to idle.

Then memory request 412 arrives targeting rank B. Next, memory request 414 arrives targeting rank B, which makes rank B now meet the minimum burst length criteria again. Thus, burst 416 takes place over Δt3. Although not shown specifically (such as with burst 406 and 410), Δt3 includes the Δt3a pre-active time, the Δt3b burst time, and the Δt3c post-active time. Rank B must exit its idle state at the beginning of Δt3 so memory requests 412 and 414 can be completed, and then rank B returns to its idle state at the end of Δt3.

Memory request 418 targeting rank A arrives next. Then memory request 420 targeting rank B arrives. As soon as memory request 422 targeting rank B arrives, the scheduler schedules burst 424 because the rank B queue again meets the minimum burst number. Burst 424 takes Δt4 to complete (including Δt4a, Δt4b, and Δt4c, which are not shown). Thus, at the beginning of Δt4, rank B must exit its idle state so memory requests 420 and 422 can be completed, and then rank B returns to its idle state.

In the example shown in FIG. 4, a second memory request does not arrive targeting rank A during the window of time shown, thus memory request 418 remains in the queue at the end of the window, waiting for another rank A-targeted request to be included in a burst.

In some embodiments, moments in time exist where more than one rank may each be in a non-idle state simultaneously due to pre- and post-active times overlapping between ranks.

Figure 5:
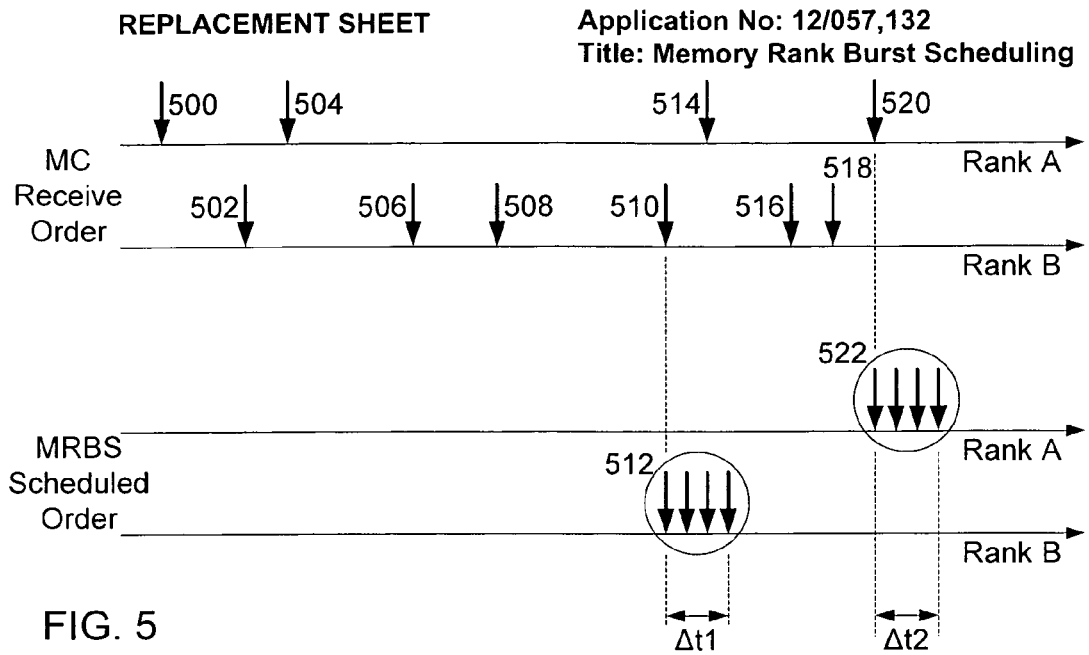

FIG. 5 describes a third embodiment of a memory request burst ordering scheme on two memory ranks. The major criteria shown here for burst scheduling is the minimum burst number being set to four. Turning now to FIG. 5, memory request 500 targeting rank A arrives first. Then memory request 502 targeting rank B arrives second. Memory request 504 targeting rank A arrives third. Continuing, memory request 506 targeting rank B arrives fourth. Memory request 508 targeting rank B arrives fifth.

Then, as soon as memory request 510 arrives targeting rank B, the scheduler has enough memory requests built up in the memory rank B queue to initiate a burst schedule (i.e. a minimum burst number of four requests are now in the memory rank B queue). Thus, the scheduler sends a burst of the four requests (requests 502, 506, 508, and 510) to memory in burst 512, which takes Δt1.

During this burst send, memory request 514 arrives targeting rank A. Next, memory requests 516 and 518 arrive sequentially and are both targeting rank B. Then memory request 520 arrives targeting rank A. At this point the scheduler again sees that a burst can take place. The scheduler sends a burst of four requests (requests 500, 504, 514, and 520) to memory in burst 522, which takes Δt2.

At this point there are still two requests in the memory rank B queue (requests 516 and 518) but the minimum burst number hasn't been reached. So as long as memory requests 516 and 518 do not reach their respective aging thresholds, they will remain in the rank B queue.

Figure 6:
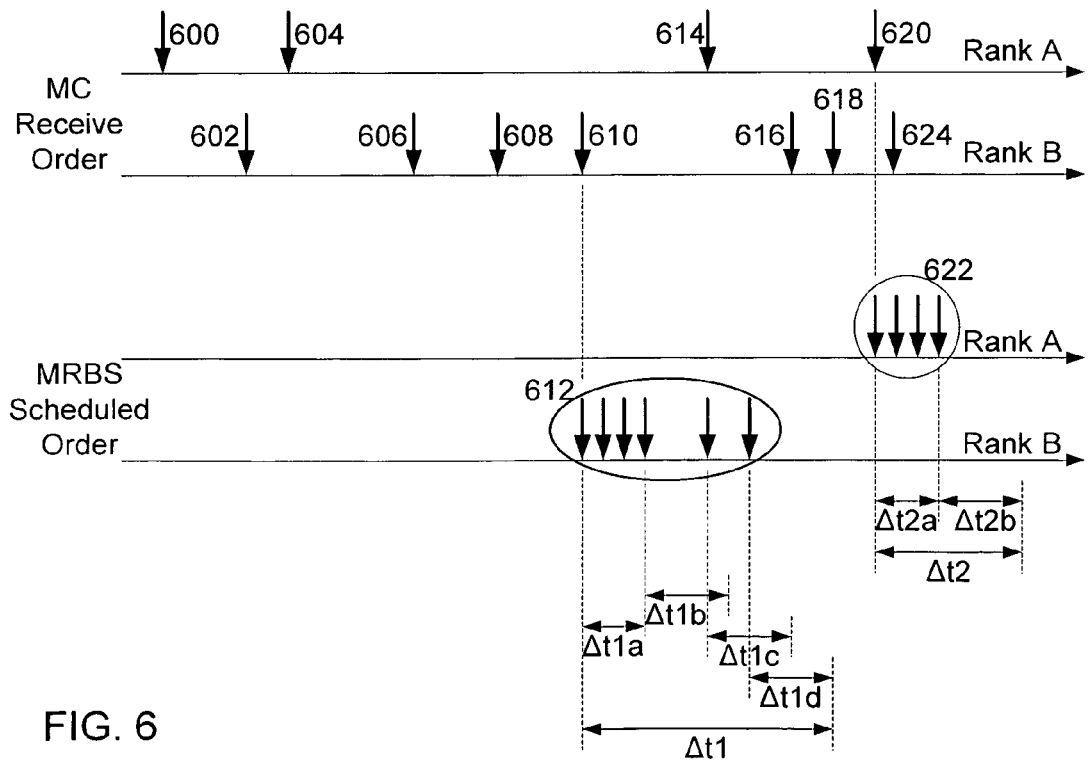

FIG. 6 describes a fourth embodiment of a memory request burst ordering scheme on two memory ranks. The major criteria shown here for burst scheduling are the minimum burst number being set to four, the maximum burst number being set to eight, and an extended rank active time is implemented. The extended rank active time is an added possible burst scheduling feature that may be implemented in certain embodiments where if no memory request in any memory rank queue has reached its aging threshold, no other memory rank queue yet has the required minimum burst number of requests in the queue, and the current working rank queue has not reached its maximum burst number, then the current working rank queue can leave its burst window open past at least the start of a scheduled burst. This would allow subsequently arriving requests from the working rank to be dynamically added onto the end of the burst before the burst has finished.

Turning now to FIG. 6, memory request 600 arrives targeting rank A. Then memory request 602 arrives targeting rank B. Next, memory request 604 arrives targeting rank A. Then memory requests 606 and 608 arrive sequentially both targeting rank B. Then as soon as memory request 610 arrives, the scheduler schedules a burst of four requests (requests 602, 606, 608, and 610) to be sent to memory in burst 612. The original four request burst takes Δt1a, but because an extended rank active time is implemented, the scheduler leaves open the possibility to dynamically add one or more additional memory requests to the burst. In some embodiments, this additional length of time is Δt1b long, and this delta of time begins as soon as the original burst finishes at the end of Δt1a.

The next memory request to arrive is request 614, which is targeting rank A. At this point the rank A queue still does not have a sufficient minimum burst number to start a burst. Then memory request 616 arrives targeting rank B. The scheduler determines that request 616 did arrive in the Δt1b extended rank active time window and that burst 612 has not reached the maximum burst number of requests, thus request 616 is immediately added to the current burst 612, and request 616 is immediately sent to memory as part of the burst. Request 616 is considered part of the current burst 612 even though there is a gap between the time at end of the original four request burst (at the end of Δt1a) and the time when request 616 is sent to memory. At this point, the same extended rank active time window length begins again and will extend to the end of Δt1c.

Then memory request 618 arrives also targeting rank B. Request 618 is also scheduled into the same burst 612 because it arrived in Δt1c extended rank active time window and burst 612 still has not reached the maximum burst number of requests. The extended rank active time window length begins again and extends to the end of Δt1d.

Memory request 620 arrives and the rank A queue at this point has the required minimum burst number of requests to schedule a rank A queue burst. Thus, the scheduler switches the working rank queue to the rank A queue and sends a four request burst 622 using requests 600, 604, 614, and 620. Thus, even though memory request 624 then arrives and is still within the Δt1d extended rank active time window, it doesn't matter because an overriding factor (the rank A queue reaching the minimum burst number of requests) has required the scheduler to switch working ranks. Therefore, request 624 must wait in the rank B queue until either the rank B queue reaches the minimum burst number again or request 624 reaches its aging threshold.

In different embodiments, if two or more rank queues meet the minimum burst number of requests to be scheduled, and no rank queue has a pending request that has reached its aging threshold, then the order in scheduling the multiple rank queues that meet the burst requirements may be done in any one of a number of implementations.

In some embodiments, a round-robin scheme between memory rank queues may be implemented. In other embodiments, a priority order of memory rank queues may be based on the age of the oldest request in each of the rank queue that meets the minimum burst number of requests. In other embodiments, a scheme that schedules rank queue bursts in an order based on the number of requests in each queue (where the queue with the largest number of requests is scheduled first and the queue with the least number of requests is scheduled last).

The point in time that a burst is locked from receiving extra requests may differ in different embodiments. In alternative embodiments to those embodiments described above in FIG. 6, a burst may not be left open for additional requests to be added to the burst after the burst has begun. In some embodiments, a burst is locked out from having additional requests added to the burst the moment the burst is scheduled. In other embodiments, a burst is locked out from having additional requests added to the burst at a point in time prior to when the burst is scheduled. For example, if a first rank is currently the working rank and a second rank gets enough requests that allow for a burst, the burst can be locked at that point even though the second rank can't have the burst scheduled until it becomes the working rank.

Furthermore, in some embodiments, the minimum burst number of requests is equal to the maximum burst number of requests. In these embodiments, the minimum burst number of requests is always scheduled. Thus, if a queue has significantly more requests than the minimum burst number of requests, the scheduler may schedule the minimum number of requests to be sent to memory on a first pass and schedule another minimum number of requests from the same queue to be sent to memory on a second pass, and so on. Thus, the same rank queue (i.e. the working rank) can continuously send out bursts of the minimum number of requests. This may continue until another rank exceeds the working rank's priority and the multiple bursts on multiple passes may then be stopped to accommodate the new highest priority rank queue.

Figure 7:
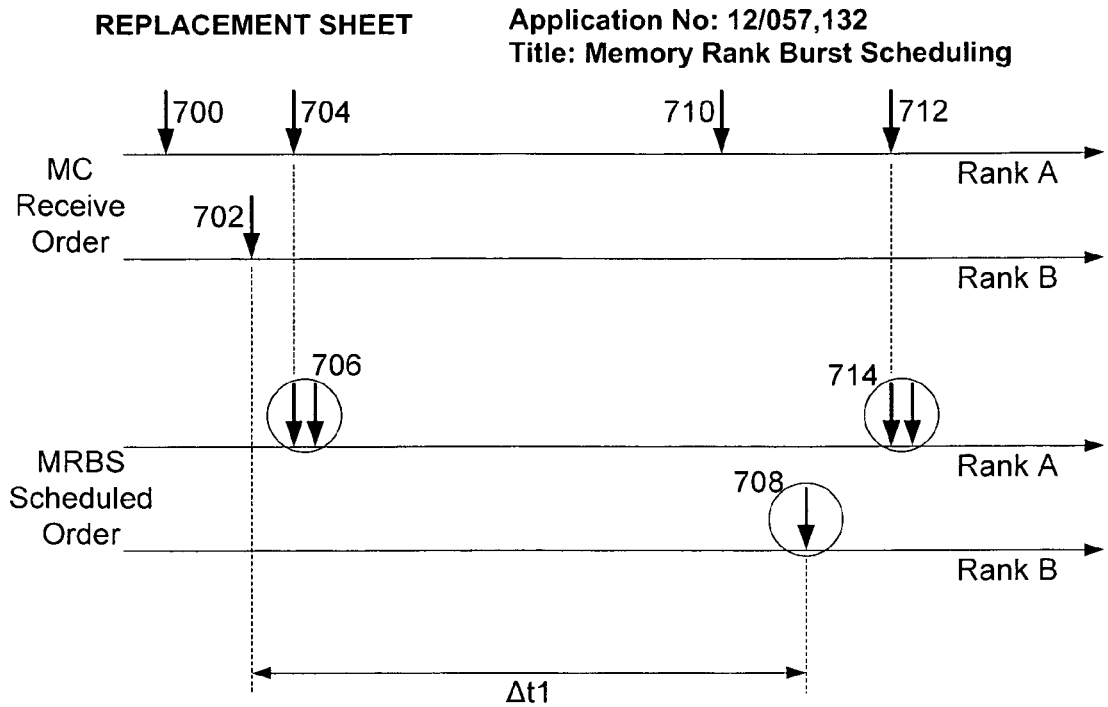

FIG. 7 describes a fifth embodiment of a memory request burst ordering scheme on two memory ranks. The major criteria shown here for burst scheduling are the minimum burst number being set to two and the aging threshold to determine request starvation is set to Δt1 (which is explained in greater detail below). As originally explained above, the aging threshold is a specific number of memory cycles where if a given memory request sits within a rank queue for more than the specific number of cycles, the request is determined to be starved and the request gets priority even if it is the only request in the rank queue and the rank queue does not meet the minimum burst number of requests requirement.

Turning now to FIG. 7, memory request 700 arrives and is targeting rank A. Then memory request 702 arrives and is targeting rank B. Once memory request 704 arrives, targeting rank A, the scheduler schedules a two request burst 706 and sends the two requests in the burst 706 (request 700 and 704) to memory. A significant number of cycles pass without further input activity, and then memory request 710 arrives targeting rank A. More cycles pass and no additional memory request arrives targeting rank B. After a period of time (Δt1) the aging counter for rank B (and specifically for memory request 702) reaches its threshold. At this point, the scheduler sends request 702 to memory with a single request "burst" 708. This allows request 702 to be completed and not starve indefinitely in the rank B queue. Thus, the aging threshold rule, requiring requests be sent to memory after an aging threshold is met, supersedes the minimum burst number rule.

Then memory request 712 targeting rank A arrives. At this point the scheduler can schedule another two request burst 714 and send requests 710 and 712 to memory.

Figure 8:
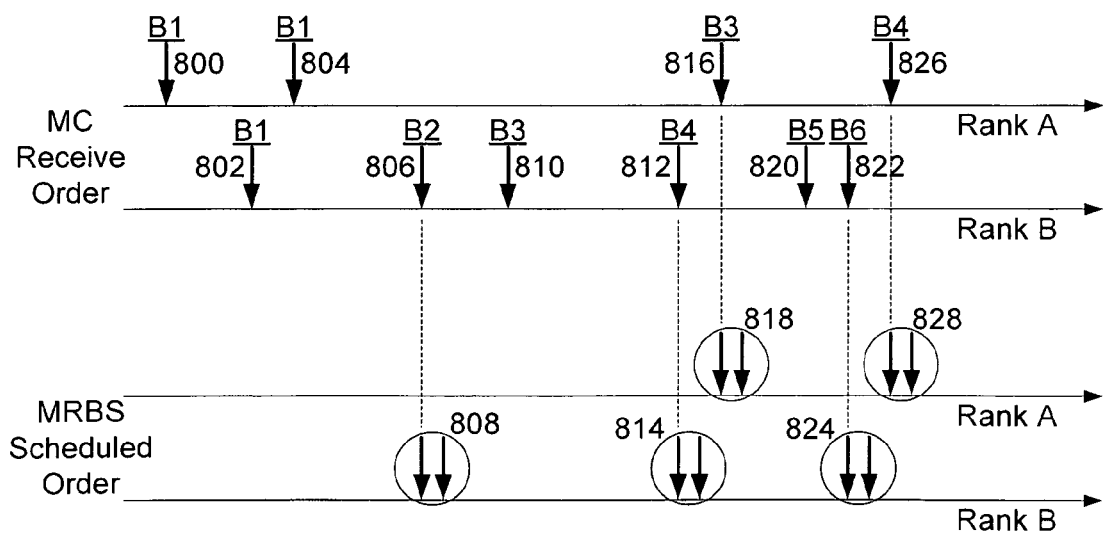

FIG. 8 describes a sixth embodiment of a memory request burst ordering scheme on two memory ranks. The major criteria shown here for burst scheduling are the minimum burst number being set to two and a requirement that each of the memory requests in a given scheduled burst must be from different banks. Thus, if two requests arrive targeting the same rank and both of those requests are targeting the same bank, the scheduler does not burst those two requests. Rather, as long as an aging threshold for any of the requests has not been hit, a third request targeting the same rank but from another bank would be required to arrive for the first and third requests to be burst scheduled.

Turning now to FIG. 8, memory request 800 arrives targeting rank A, bank 1. Then memory request 802 arrives targeting rank B, bank 1. Then memory request 804 arrives targeting rank A, bank 1. The scheduler does not schedule a two request burst from the rank A queue because requests 800 and 804 are targeting the same bank.

Then memory request 806 arrives targeting rank B, bank 2 and the scheduler sends a two request burst 808 to memory using requests 802 and 806. Next, memory request 810 arrives targeting rank B, bank 3. Then memory request 812 arrives targeting rank B, bank 4 and the scheduler sends a two request burst to memory using requests 810 and 812. Then memory request 816 arrives targeting rank A, bank 3. This causes the scheduler to send a two request burst 818 to memory using requests 800 and 816. Request 800 is utilized in burst 818 because it was the first of the two bank 1 requests to arrive, so it is completed first.

Next, memory request 820 arrives targeting rank B, bank 5. Then memory request 822 arrives targeting rank B, bank 6 and the scheduler sends another two request burst 824 to memory using requests 820 and 822. Then memory request 826 arrives targeting rank A, bank 4. Thus, the scheduler sends a two request burst 828 to memory using the second of the two rank A, bank 1 requests 804 as well as request 826.

In other embodiments, two or more requests from the same bank can be scheduled in the same rank burst if all of the two or more requests from the same bank are page hits to the same memory page (this will reduce memory overhead).

Other criteria may be utilized to determine which requests to group for rank bursts. For example, in some embodiments, there are two queues per rank, one for memory read requests and one for memory write requests. This split queue can be implemented as if the read queue and the write queue per rank are thought of as completely independent queues (similar to the queues for two different ranks). Another example of a queue criteria is that any request within a queue that has a memory timing conflict (which depends on what type of memory implementation is utilized in the system) may be excluded from bursts. For example, a request that has a memory row cycle time (tRC) conflict which may significantly increase the response from memory for that request, may be excluded. Many other criteria may be involved, and all of the above mentioned specific criteria are just used as examples. Thus, the MRBS engine should not be limited to these example criteria.

In many embodiments, even when a criteria is met to immediately schedule a memory request, such as if a memory request reaches its aging threshold, the memory request does not immediately get scheduled. Rather, the scheduler changes the working rank queue to the rank queue that contains the memory request to be immediately scheduled after the current scheduling burst has completed (if there is any burst in the midst of scheduling).

Figure 9:
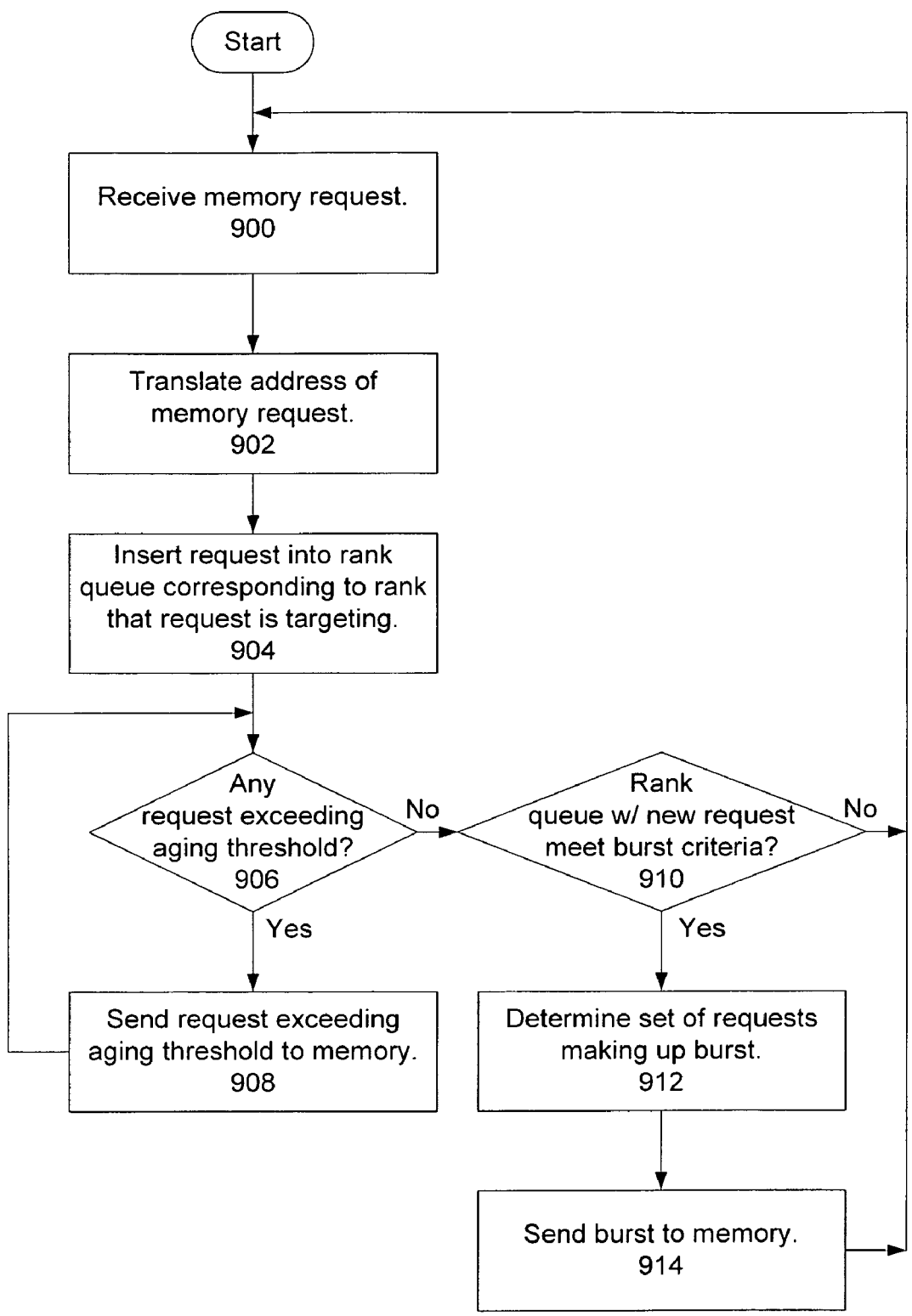
FIG. 9 is a flow diagram of an embodiment of a process to send bursts of memory requests on a rank-by-rank basis.

FIG. 9 is a flow diagram of an embodiment of a process to send bursts of memory requests on a rank-by-rank basis. The process is performed by processing logic that may comprise software, hardware, or a combination of both. Turning to FIG. 9, the process begins by processing logic receiving a memory request (processing block 900). The request may come from a processor or an I/O device in different embodiments.

Next, processing logic translates the address the memory request is targeting to determine which memory rank the address resides within (processing block 902). Then processing logic inserts the request into a memory rank queue corresponding to the rank that the request is targeting (processing block 904). Once the request is in a certain rank queue, processing logic determines whether there is any request residing in any of the rank queues that has surpassed its aging threshold (processing block 906).

If there is a request that has exceeded its aging threshold, then processing logic sends that request to memory (processing block 908) and processing logic returns to block 906 to determine if another request has exceeded its aging threshold.

Otherwise, if no request has exceeded its aging threshold, then processing logic examines the particular rank queue that the new request was added to in block 904 to determine whether the rank queue meets all the criteria to initiate a burst from that rank to memory (processing block 910). These criteria have been discussed in detail above (e.g. minimum burst number of requests in queue).

If the no criteria have been met for a burst, then processing logic returns to the beginning of the process flow and receives the next memory request (processing block 900). Otherwise, if one or more of the criteria have been met, processing logic determines the set of requests making up the burst (processing block 912). In some embodiments, this set includes the entire number of requests in the rank queue in question. In other embodiments, due to same bank issues, the maximum burst number exceeded, other potential issues, this set may not include the entire number of requests in the rank queue.

Once the burst has been determined, processing logic sends the burst to memory (processing block 914) and the process is finished, which sends the process flow back to the beginning and allows processing logic to receive the next memory request.

In many embodiments, many of the processing blocks in FIG. 9 may be performed by processing logic in parallel. For example, processing blocks 900, 902, and 904 may be continuously performed as requests continue to arrive. Thus these blocks may be processed at the same time for one request as processing logic is going through the determinative blocks (906 and/or 910) for another request.

Thus, embodiments of a method, device, and system to schedule memory requests using a memory rank burst scheme are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A device, comprising:
   a plurality of memory rank queues, wherein each of the plurality of memory rank queues is operable to
      store all pending memory requests targeting addresses within a corresponding memory rank in a memory;
      track a number of banks of the memory rank being targeted by all stored memory requests in the memory rank queue; and
      track the age of each stored memory request in the memory rank queue using an aging counter; and
   a memory request scheduler to
      schedule at least a minimum burst number of memory requests within one of the plurality of memory rank queues to be sent to the memory when at least the minimum burst number has been reached in the one of the plurality of memory rank queues;
      schedule at least one memory request to be sent to the memory when the age of the at least one memory request exceeds an aging threshold; and
      schedule the memory requests in one of the plurality of memory rank queues up to a maximum burst number of memory requests prior to scheduling the memory requests in another of the plurality of memory rank queues.

2. The device of claim 1, wherein each of the scheduled memory requests within the one of the plurality of memory rank queues is from a different memory bank.

3. The device of claim 2, wherein the memory request scheduler is further operable to:
   schedule the at least one memory request exceeding the aging threshold in a priority manner before scheduling any memory rank queue with the at least minimum burst number of memory requests.

4. The device of claim 2, wherein the memory request scheduler is further operable to:
   leave any memory request out of the minimum burst number of memory requests to be scheduled that has a memory timing conflict.

5. The device of claim 1, wherein the memory request scheduler is further operable to:
   schedule each of the plurality of memory rank queues with at least the minimum burst number of memory requests in a oldest age request priority manner when none of the plurality of memory requests exceed the aging threshold.

6. The device of claim 1, wherein the memory request scheduler is further operable to:
   schedule each of the plurality of memory rank queues with at least the minimum burst number of memory requests in an order starting from a memory rank queue with the largest number of memory requests to a memory rank queue with the least number of memory requests.

7. The device of claim 1, wherein the memory request scheduler is further operable to:
   schedule the minimum burst number of memory read requests within the one of the plurality of memory rank queues to be sent to the memory in a first scheduling pass; and
   schedule the minimum burst number of memory write requests within the one of the plurality of memory rank queues to be sent to the memory in a second scheduling pass.

8. A system, comprising:
   a multi-rank, multi-bank memory; and
   a memory controller communicatively coupled to the memory, the memory controller including a memory rank burst scheduling engine comprising
      a plurality of memory rank queues, wherein each of the plurality of memory rank queues is operable to
         store all pending memory requests targeting addresses within a corresponding memory rank;
         track a number of banks of the memory rank being targeted by all stored memory requests in the memory rank queue; and
         track the age of each stored memory request in the memory rank queue using an aging counter; and
      a memory request scheduler to schedule at least a minimum burst number of memory requests within one of the plurality of memory rank queues to be sent to the memory when at least the minimum burst number has been reached in the one of the plurality of memory rank queues;

schedule at least one memory request to be sent to the memory when the age of the at least one memory request exceeds an aging threshold; and schedule the memory requests in one of the plurality of memory rank queues up to a maximum burst number of memory requests prior to scheduling the memory requests in another of the plurality of memory rank queues.

9. The system of claim 8, wherein each of the scheduled memory requests within the one of the plurality of memory rank queues is from a different memory bank.

10. The system of claim 9, wherein the memory request scheduler is further operable to:

schedule the at least one memory request exceeding the aging threshold in a priority manner before scheduling any memory rank queue with the at least minimum burst number of memory requests.

11. The system of claim 10, wherein the memory request scheduler is further operable to:

schedule each of the plurality of memory rank queues with at least the minimum burst number of memory requests in an order starting from a memory rank queue with the largest number of memory requests to a memory rank queue with the least number of memory requests.

12. The system of claim 8, wherein the memory request scheduler is further operable to:

schedule the minimum burst number of memory read requests within the one of the plurality of memory rank queues to be sent to the memory in a first scheduling pass; and schedule the minimum burst number of memory write requests within the one of the plurality of memory rank queues to be sent to the memory in a second scheduling pass.

13. The system of claim 8, wherein the memory request scheduler is further operable to:

leave any memory request out of the minimum burst number of memory requests to be scheduled that has a row cycle time (tRC) conflict.

14. The system of claim 8, further comprising:

a memory rank power manager to power up to an active power state the memory rank of the plurality of memory ranks that is currently being scheduled; and power down to an idle power state each memory rank of the plurality of memory ranks that is not currently being scheduled.

15. A method, comprising:

grouping a plurality of memory requests into a plurality of memory rank queues where each rank queue contains the memory requests of the plurality of memory requests targeting addresses within the corresponding memory rank in a memory;

scheduling at least a minimum burst number of memory requests within one of the plurality of memory rank queues to be sent to the memory when the burst number has been reached in the one of the plurality of memory rank queues;

scheduling at least one memory request to be sent to the memory when the at least one memory request exceeds an aging threshold; and scheduling the memory requests in one of the plurality of memory rank queues up to a maximum burst number of memory requests prior to scheduling the memory requests in another of the plurality of memory rank queues.

16. The method of claim 15, wherein each of the scheduled memory requests within the one of the plurality of memory rank queues is from a different memory bank.

17. The method of claim 16, wherein the at least one memory request exceeding the aging threshold takes priority in scheduling over any memory rank queue with the at least minimum burst number of memory requests.

18. The method of claim 16, further comprising:

leaving any memory request out of the minimum burst number of memory requests to be scheduled that has a memory timing conflict.

19. The method of claim 5, further comprising:

scheduling each of the plurality of memory rank queues with at least the minimum burst number of memory requests in a round robin manner when none of the plurality of memory requests exceed the aging threshold.

20. The method of claim 5, further comprising:

scheduling each of the plurality of memory rank queues with at least the minimum burst number of memory requests in an order starting from a memory rank queue with the largest number of memory requests to a memory rank queue with the least number of memory requests.

21. The method of claim 15, further comprising:

scheduling the minimum burst number of memory read requests within the one of the plurality of memory rank queues to be sent to the memory in a first scheduling pass; and scheduling the minimum burst number of memory write requests within the one of the plurality of memory rank queues to be sent to the memory in a second scheduling pass.

22. The method of claim 15, further comprising:

managing a plurality of power states for the plurality of memory ranks in the memory by powering up to an active power state the memory rank of the plurality of memory ranks that is currently being scheduled; and powering down to an idle power state each memory rank of the plurality of memory ranks that is not currently being scheduled.

* * * * *